United States Patent
Ahn

(10) Patent No.: US 8,255,133 B2
(45) Date of Patent: Aug. 28, 2012

(54) SHIFT TIMING INDICATOR SYSTEM FOR VEHICULAR MANUAL TRANSMISSION

(75) Inventor: Samuel S. Ahn, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 552 days.

(21) Appl. No.: 12/479,347

(22) Filed: Jun. 5, 2009

(65) Prior Publication Data
US 2010/0312442 A1   Dec. 9, 2010

(51) Int. Cl.
F16H 61/00   (2006.01)

(52) U.S. Cl. .......................................... 701/64; 340/441

(58) Field of Classification Search .................. 701/51, 701/55, 64; 702/182, 183; 340/439, 441; 714/25, 100; 477/94, 116
See application file for complete search history.

(56) References Cited

U.S. PATENT DOCUMENTS

| | | |
|---|---|---|
| 4,150,497 A | 4/1979 | Weber |
| 4,174,766 A | 11/1979 | Kalogerson |
| 4,354,173 A | 10/1982 | Kuhn et al. |
| 4,438,423 A | 3/1984 | Stier |
| 4,439,158 A | 3/1984 | Weber |
| 4,439,833 A | 3/1984 | Yamaguchi et al. |
| 4,463,427 A | 7/1984 | Bonnetain et al. |
| 4,509,040 A | 4/1985 | Seko et al. |
| 4,550,596 A | 11/1985 | Ueda |
| 4,604,700 A | 8/1986 | Igarashi et al. |
| 4,622,637 A | 11/1986 | Tomita et al. |
| 4,683,455 A | 7/1987 | Kido et al. |
| 4,703,304 A | 10/1987 | Muguruma et al. |
| 4,752,883 A * | 6/1988 | Asakura et al. ................. 701/64 |
| 4,823,596 A | 4/1989 | Meyers et al. |
| 4,853,673 A | 8/1989 | Kido et al. |
| 4,868,756 A | 9/1989 | Kawanabe et al. |
| 5,017,916 A | 5/1991 | Londt et al. |
| 5,064,039 A | 11/1991 | Otsuka et al. |

(Continued)

FOREIGN PATENT DOCUMENTS

CN   101099055   1/2008

(Continued)

OTHER PUBLICATIONS

SAE International: "Automated Manual Transmission with Torque Assist Mechanism for Reducing Shift Shock," Document No. 2005-01-1783, Published Apr. 2005.

*Primary Examiner* — Dalena Tran

(74) *Attorney, Agent, or Firm* — Brinks Hofer Gilson & Lione

(57) ABSTRACT

An improper gear shift timing indicator system for a manual transmission vehicle. The system includes a gear position detector for detecting gear position information and a control unit in communication with the gear position detector. The control unit is configured to detect a gear shift event based on a change in the gear position information. The control unit measures elapsed time during the gear shift event and compares the elapsed time with a threshold value, which is based on various vehicle operating parameters and the given gear shift event. A signal system is in communication with the control unit and the control unit causes the signal system to provide a signal to a driver of the vehicle when the elapsed time of the gear shift event is less than the threshold value.

17 Claims, 2 Drawing Sheets

U.S. PATENT DOCUMENTS

| | | |
|---|---|---|
| 5,089,965 A | 2/1992 | Braun |
| 5,477,452 A | 12/1995 | Milunas |
| 6,145,398 A * | 11/2000 | Bansbach et al. ............... 74/335 |
| 6,459,981 B1 | 10/2002 | Gimmler et al. |
| 6,567,735 B1 | 5/2003 | Bortfeld et al. |
| 6,699,155 B2 | 3/2004 | Nagasaka |
| 7,447,584 B2 | 11/2008 | McMullen |
| 7,757,577 B2 * | 7/2010 | Kawamoto et al. ............. 74/335 |
| 2002/0010539 A1 | 1/2002 | Machida et al. |
| 2006/0047395 A1 | 3/2006 | Ikeya et al. |
| 2008/0242504 A1 | 10/2008 | Kraemer et al. |

FOREIGN PATENT DOCUMENTS

| | | |
|---|---|---|
| EP | 0 718 142 | 6/1999 |
| JP | 62-53235 | 3/1987 |
| JP | 62-53236 | 3/1987 |
| JP | 63-13827 | 1/1988 |
| WO | WO 2008/036014 | 3/2008 |

* cited by examiner

SHIFT TIMING INDICATOR SYSTEM FOR VEHICULAR MANUAL TRANSMISSION

BACKGROUND

1. Field of the Invention

The present invention generally relates to gear shift indicating systems. More specifically, the invention relates to an optimal shift timing indicator system for a manual transmission of a motor vehicle and method for operating the same.

2. Description of Related Art

Modern manual transmissions allow smooth gear changes through the use of mechanical synchronizers. Because the synchronizers are friction elements by design, their durability is closely linked to shift timing and, thus, a driver's skill level and consistency when performing gear changes. A shifting problem arises when drivers shift gears too quickly for a given shift (e.g., first-second, second-third, sixth-fifth) because forcing the transmission to synchronize too quickly for a certain range of operating conditions can lead to premature synchronizer wear and possibly increased warranty costs for the vehicle manufacturer.

Vehicle manufacturers have employed various types of audible or visual indicators in vehicles with manual transmissions to inform the driver when to downshift or upshift, generally to improve fuel economy and/or decrease emissions. These indicators, however, do not address the problem of improper shift timing and undue wear on manual transmission components as a result thereof.

In view of the above, it is apparent that there exists a need for a manual transmission gear shift timing indicator system that aids the driver in shifting gears within an optimal range of shift time duration to improve the durability of transmission components and lower the maintenance and warranty costs associated therewith.

SUMMARY

In satisfying the above need, as well as overcoming the enumerated drawbacks and other limitations of the related art, the present invention provides a gear shift indicator system and method for alerting a driver of improper gear shift timing.

In one embodiment of the present invention, a system for indicating improper gear shift timing in a manual transmission vehicle includes a gear position detector for detecting gear position information, a control unit in communication with the gear position detector, and an indicator in communication with the control unit. In this embodiment, the control unit is configured to receive the gear position information from the gear position detector and to detect a gear shift event based on a change in the gear position information. The control unit is further configured to measure elapsed time during the gear shift event and to compare the elapsed time of the gear shift event with a threshold value. If the elapsed time of the gear shift event is less than the threshold value, the control unit is further configured to cause the signal system to provide a signal to a driver of the vehicle.

In another embodiment of the present invention, a method of indicating improper gear shift timing in a manual transmission vehicle includes detecting a gear shift event, measuring elapsed time during the gear shift event, comparing the elapsed time with a threshold value, and alerting a driver of the vehicle when the elapsed time is less than the threshold value.

Further objects, features and advantages of this invention will become readily apparent to persons skilled in the art after a review of the following description, with reference to the drawings and claims that are appended to and form a part of this specification.

DETAILED DESCRIPTION

Figure 1:
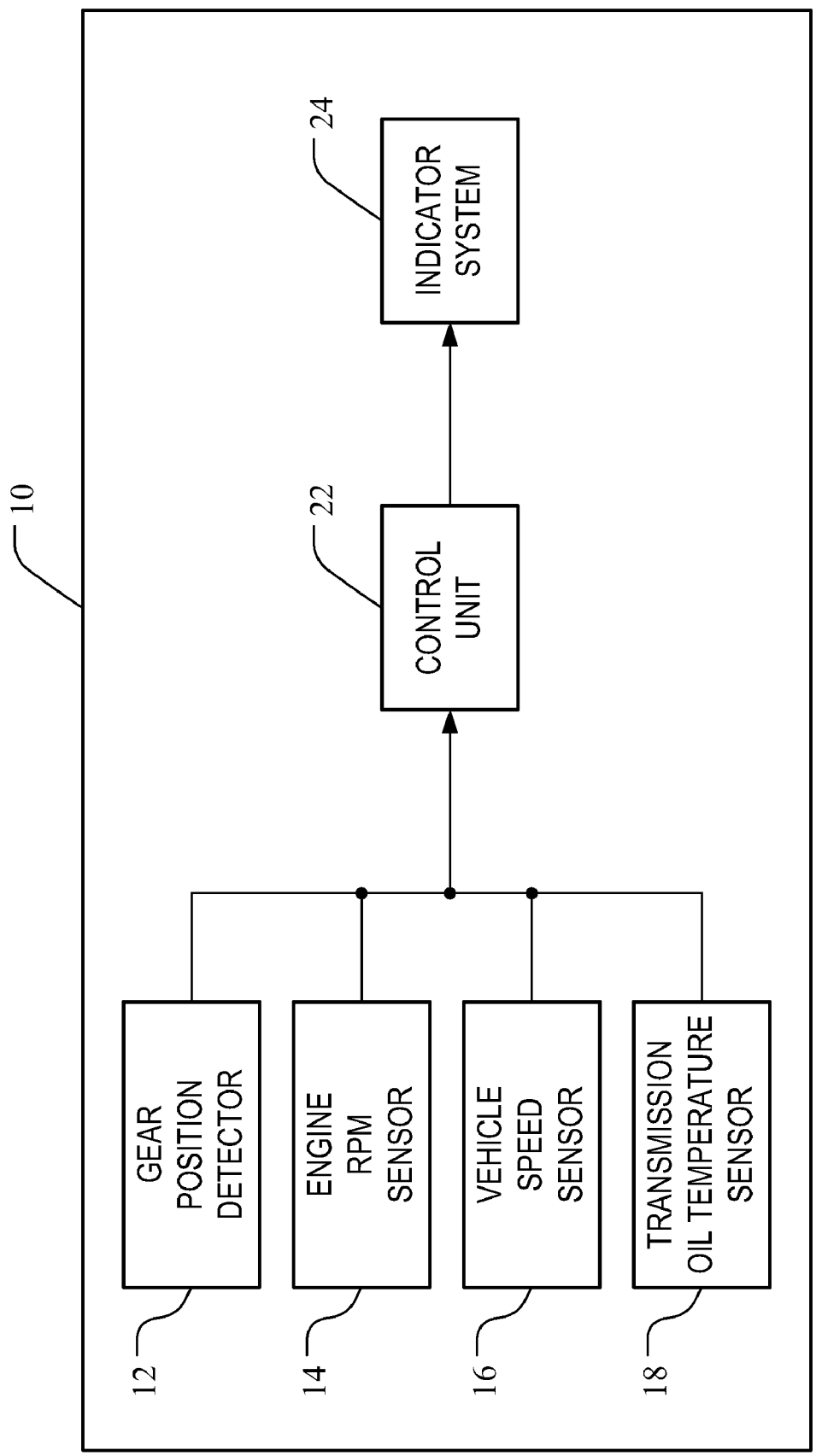
FIG. 1 is a block diagram of an improper gear shift timing indicator system embodying the principles of the present invention.

Referring now to FIG. 1, a gear shift timing indicator system embodying the principles of the present invention is illustrated therein and designated at 10. The system device 10 generally includes a gear position detector 12 and a number of engine operating sensors, including, for example, an engine rpm sensor 14, a vehicle speed sensor 16, and a transmission oil temperature sensor 18. The system 10 may also include other engine operating sensors known in the art.

The gear position detector 12 and the sensors 14, 16, and 18 are electronically coupled, by any suitable means, to a powertrain control module or control unit 22. The control unit 22 is in turn coupled to an indicator or signal system 24.

Preferably, the gear position detector 12 is located in associate with the vehicle's gear selector linkage. This linkage determines the gear or gear range of operation for the transmission. As such, the gear position detector 12 may be operatively coupled to the gear shift lever of the manual transmission in either a mechanical or electrical relationship, as is known in the art. During operation, the gear position detector 12 continuously detects the gear position of the vehicle's transmission and communicates this gear position to the control unit 22 at a predetermined frequency. Such detection is commonplace and well known in the industry and the details thereof need not be further discussed herein.

The control unit 22 determines when a gear shift event is occurring by detecting a change in the gear position, as communicated by the gear position detector 12. For example, a gear shift event is detected whenever the driver shifts from one gear to another, such as from first gear to second gear, from second gear to third gear, or from sixth gear to fifth gear, etc. More specifically, the control unit 22 is configured to determine the elapsed time of the gear shift event by being preferably internally equipped with a timer. The timer measuring the time it takes the driver of the vehicle to shift between one gear position and another gear position.

In a preferred embodiment, the control unit 22 receives gear position information from the gear position detector 12 and determines when a shift from a first gear position is initiated. Notably, this information may take many alternative forms, including being a signal (or a lack of a signal) indicating that the gear shift lever has been taken out of gear, or conversely indicting that the gear shift lever is in a particular gear. Upon receiving this gear position information indicating the starting of a gear shift event, the control until 22 initiates the timer. Thereafter, the timer runs until the control unit 22 receives information from the gear position detector 12 that the gear shift event has been completed, i.e., that the shift from the one gear position to another gear position has been completed. This may be accomplished via a signal indicating that the gear shift lever has been shifted back in gear or, alternatively, by the ending of a signal that indicated that the transmission was out of gear.

The control unit 22 measures the elapsed time of the gear shift event and compares the elapsed time with a predetermined threshold value to determine whether the driver's shift timing is less than the threshold value. Preferably, a threshold value look-up table or map, determined in accordance with a particular gear shift events for a given set of vehicle operating parameters, is stored within the memory of the control unit 22. As suggested earlier, the engine operating parameters may include, without limitation, information such as engine speed from an engine speed sensor 14, vehicle speed from a vehicle speed sensor 16, transmission oil temperature from a transmission oil temperature sensor 18 and/or other operational parameters. Once the elapsed time of a gear shift event has been measured, the control unit 22 uses information from the various vehicle sensors 14, 16, and 18 in conjunction with the look-up tabled to determine the threshold value designated for the particular gear shift event and the detected vehicle operating parameters.

Next, the control unit 22 compares the measured elapsed of the gear shift event with the threshold value. If the elapsed time of the gear shift event is less than the threshold value, i.e., the actual shift time is quicker than the threshold value, the control unit 22 sends a signal to the signal system 24. Thereafter, the system 24 alerts the driver, either visually or audibly, that the shift event occurred too fast.

Preferably, the signal system 24 includes a display located in the instrument cluster of the vehicle and is readily visible to the driver of the vehicle. As such, the signal system 24 may include an indicator lamp that flashes either alone or in combination with an audible alarm that sounds, when improper gear shift timing is detected. By receiving the signal from the signal system 24, the driver is made aware that he or she is shifting too quickly and needs to slow down the shifting process for that particular type of gear shift event.

Figure 2:
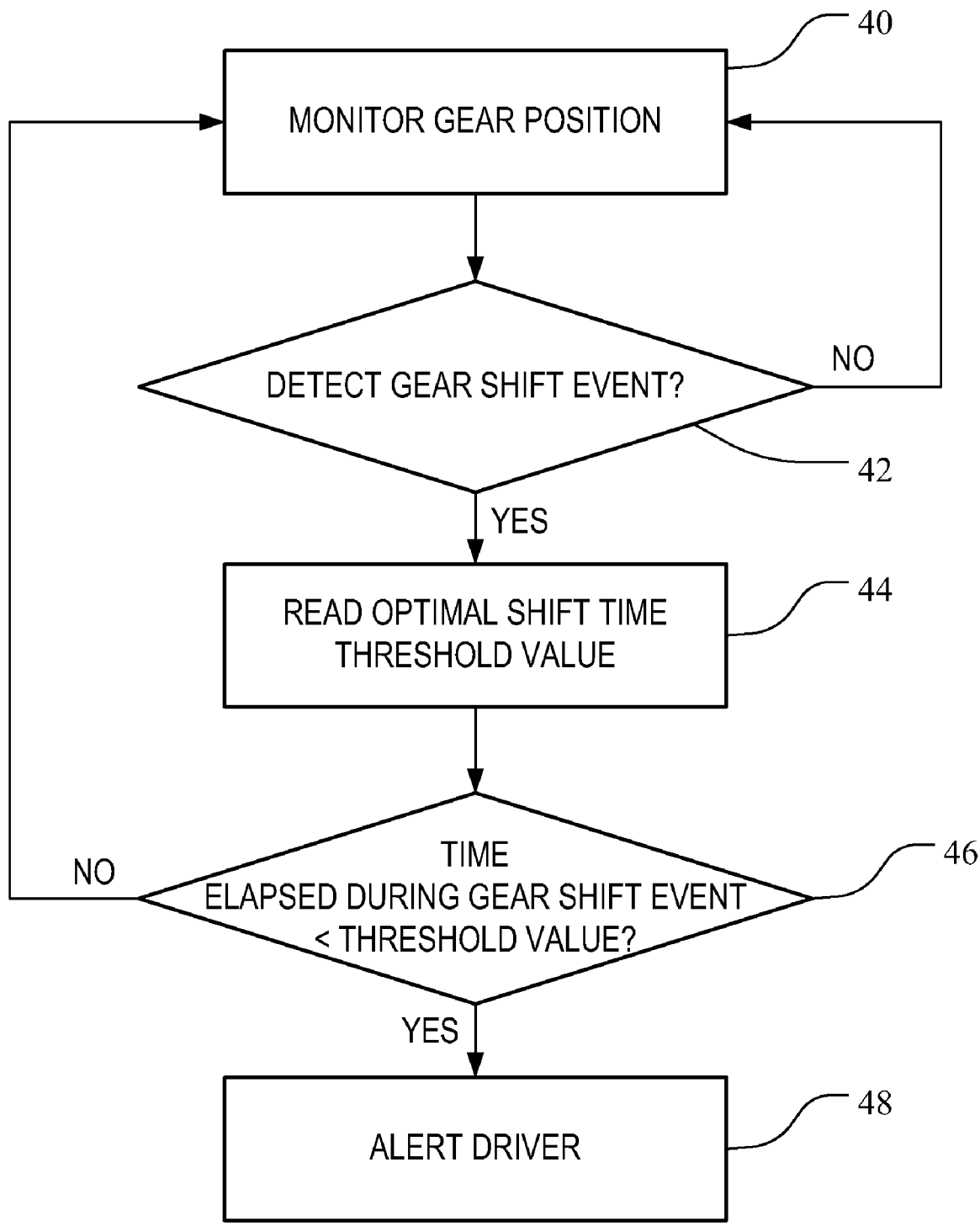
FIG. 2 is a flow chart showing a method for indicating improper gear shift timing in accordance with the principles of the present invention.

Referring now to FIG. 2, shown therein is a flow chart generally illustrating a method embodying the principles of the present invention.

The method begins in step 40 where the gear position detector 12 monitors the gear position of the manual transmission and communicates the gear position to the control unit 22. In step 42, the control unit 22 determines whether a change in gear position has occurred, i.e., a gear shift event. If there is no change in gear position, the method returns to step 40 and starts over, continuing the monitoring of the gear position via gear position information received from the gear position detector 12.

If a change in gear position is detected by the control unit 22, the control unit 22 initiates a timer and measures the actual time elapsed of the gear shift event, and, utilizing information from various vehicle operating parameter sensors 14, 16, 18, in step 44, the control unit 22 accesses a look-up table stored in its memory. The look-up table determines the minimum gear shift time, in other words, the threshold value for a particular gear shift event under the specific vehicle operating parameters. While the vehicle operating parameters are preferably determined at the initiation of the gear shift event, they may be determined during the gear shift event, after the gear shift event or a combination of this timing.

In step 46, the control unit 22 compares the measured elapsed time of the gear shift event with the threshold value. If the elapsed time of the gear shift event is equal to or exceeds the threshold value, i.e., the actual shift time is equal to or slower than the minimum shift time, then the method returns to step 40 and starts over with the control unit 22 continuing to monitor the gear position via the gear position detector 12. If, however, the elapsed time of the gear shift event is less than the threshold value, i.e., the actual shift time is faster than the minimum shift time, the control unit 22, at step 48, causes the signal system to visibly and/or audibly alert the driver of the vehicle that he or she has shifted too quickly between gear positions. As noted above, this helps the driver to recognize that he or she is shifting too fast between gear positions. As a result of the increased awareness, it is the intention of this invention that the driver will become more aware of shift timing and, likely, slow down when performing such gear shift thereby reducing premature synchronizer wear associated with improper gear shift timing.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A system for indicating in a manual transmission vehicle of improper gear shift timing by an operator of the vehicle, the system comprising:

a gear position detector configured to detect gear position information;

a control unit in communication with the gear position detector, the control unit configured to receive the gear position information from the gear position detector and to determine a gear shift event performed by an operator of the vehicle based on a change in the gear position information, wherein the control unit being further configured to measure elapsed time during the gear shift event and to compare the elapsed time of the gear shift event with a threshold value; and a signal system in communication with the control unit, wherein the control unit is configured to cause the signal system to provide a signal to the operator of the vehicle when the elapsed time of the gear shift event performed by the operator of the vehicle is less than the threshold value, whereby the operator of the vehicle is warned of conditions that can result in premature wear of components in the manual transmission.

2. The system of claim 1, wherein the gear shift event is a change in gear position from one gear position to another gear position.

3. The system of claim 1, further comprising at least one vehicle operating parameter sensor, the control unit being coupled to the vehicle operating parameter sensor and configured to monitor the vehicle operating parameter sensor, the threshold value being determined in part based on the vehicle operating parameter sensed by the vehicle operating parameter sensor.

4. The system of claim 3, wherein the vehicle operating parameter sensor senses one selected from a group of vehicle speed, engine speed and transmission oil temperature.

5. The system of claim 4, further comprising at least one of an engine speed sensor, a vehicle speed sensor, and a transmission oil temperature sensor in communication with the control unit.

6. The system of claim 1, wherein the signal provided by the signal system is an audible or visual signal.

7. The system of claim 1, wherein the gear position detector is configured to detect when the transmission is in gear.

8. The system of claim 1, wherein the gear position detector is configured to detect when the transmission is out-of-gear.

9. A method of indicating improper gear shift timing by an operator of a vehicle having a manual transmission vehicle with a gear position detector, a control unit in communication with the gear position detector and a signal system in communication with control unit, the method comprising:
- having the gear position detector detecting a gear shift event performed by the operator of the vehicle;
- having the control unit measure elapsed time of the gear shift event performed by the operator of the vehicle based upon information received from the gear position detector;
- comparing the elapsed time with a threshold value stored by the control unit; and
- providing a signal to the operator of the vehicle when the elapsed time is less than the threshold value by having the control unit communicate with the signal system, whereby the operator of the vehicle is warned of conditions that can result in premature wear of components in the manual transmission.

10. The method of claim 9, wherein the step of detecting the gear shift event includes receiving gear position information from a gear position detector and determining the gear shift event based on a change in the gear position information, wherein receiving the gear position information and detecting the gear shift event is performed by a control unit in communication with the gear position detector.

11. The method of claim 9, wherein the step of measuring the elapsed time of the gear shift event is performed by a timer within a control unit.

12. The method of claim 9, wherein the step of comparing the elapsed time with the threshold value includes monitoring vehicle operating parameters and determining the threshold value based on the vehicle operating parameters, wherein the steps of monitoring the vehicle operating parameters, determining the threshold value, and comparing the elapsed time with the threshold value is performed by the control unit.

13. The method of claim 12, wherein the step of monitoring the vehicle operating parameters includes the step of monitoring a vehicle operating parameter selected from a group consisting of vehicle speed, internal combustion engine speed, transmission oil temperature, and gear position.

14. The method of claim 13, wherein step of monitoring the vehicle operating parameters includes receiving information from at least one of an engine rpm sensor, a vehicle speed sensor, and a transmission oil temperature sensor in communication with the control unit.

15. The method of claim 9, wherein the step of providing the signal to the driver is performed by a signal system in communication with the control unit.

16. The method of claim 9, wherein the step of providing the signal to the driver includes providing one of an audible or visual signal.

17. The method of claim 9, wherein the step of detecting the gear shift event includes detecting a change in gear position from one gear position to another gear position.

* * * * *